United States Patent
Mashayekhi et al.

(10) Patent No.: US 8,582,604 B2
(45) Date of Patent: Nov. 12, 2013

(54) UNIQUELY DECODABLE CODES AND DECODER FOR OVERLOADED SYNCHRONOUS CDMA SYSTEMS

(76) Inventors: Omid Mashayekhi, Stanford, CA (US); Farokh Marvasti, London (GB)

( * ) Notice: Subject to any disclaimer, the term of this patent is extended or adjusted under 35 U.S.C. 154(b) by 294 days.

(21) Appl. No.: 13/082,084

(22) Filed: Apr. 7, 2011

(65) Prior Publication Data

US 2012/0257640 A1     Oct. 11, 2012

(51) Int. Cl.
   *H04J 13/00*     (2011.01)
(52) U.S. Cl.
   USPC .......................................................... 370/479
(58) Field of Classification Search
   None
   See application file for complete search history.

(56) References Cited

U.S. PATENT DOCUMENTS

2005/0265224 A1* 12/2005 Lee et al. ...................... 370/209
2006/0120471 A1   6/2006 Learned et al.
2006/0171294 A1*  8/2006 Son et al. ....................... 370/208

OTHER PUBLICATIONS

Alishahi, K. et al.; "The Enigma of CDMA Revisited"; May 5, 2010; 80 pp.
Chang, Shih-Chun, et al.; "Coding for T-User Multiple-Access Channels"; IEEE Transactions on Information Theory; vol. IT-25; No. 6; Nov. 1979; pp. 684-691.
Karystinos, George N., et al.; "New Bounds on the Total Squared Correlation and Optimum Design of DS-CDMA Binary Signature Sets"; IEEE Transactions on Communications; vol. 51; No. 1; Jan. 2003; pp. 48-51.
Learned, Rachel E., et al.; "Low Complexity Optimal Joint Detection for Oversaturated Multiple Access Communications"; IEEE Transactions on Signal Processing; vol. 45; No. 1; Jan. 1997; pp. 113-123.
Pad, Pedram, et al.; "A Class of Errorless Codes for Overloaded Synchronous Wireless and Optical CDMA Systems"; IEEE Transactions on Information Theory; vol. 55; No. 6; Jun. 2009; pp. 2705-2715.

* cited by examiner

*Primary Examiner* — Chi Pham
*Assistant Examiner* — Kouroush Mohebbi
(74) *Attorney, Agent, or Firm* — Christie, Parker & Hale, LLP

(57) ABSTRACT

A recursive method for constructing uniquely decodable codes for overloaded synchronous CDMA systems, where large signature codes with growing overloading factors are reconstructed from the small ones. A class of uniquely decodable signature matrices (or encoders) for overloaded synchronous CDMA are also devised. A decoder for synchronous CDMA systems to extract the user data by a number of comparisons with respect to some predefined thresholds.

9 Claims, 3 Drawing Sheets

UNIQUELY DECODABLE CODES AND DECODER FOR OVERLOADED SYNCHRONOUS CDMA SYSTEMS

FIELD OF INVENTION

The present invention relates generally to the field of telecommunications and more specifically to codes and decoder for synchronous Code division multiple access (CDMA) and Compressed Sensing (CS) systems.

BACKGROUND

Code Division Multiple Access (CDMA) has become an important component of recent communication systems. CDMA is a channel access communication scheme used by various radio communication technologies, including cellular networks. CDMA allows several transmitters to send information simultaneously over a single communication channel, that is, Multiple Access. This lets several users share a band of frequencies. A CDMA scheme typically employs spread-spectrum methods and a special coding scheme, in which each transmitter is assigned a code, to allow multiple users to be multiplexed over the same physical channel. Typically, in CDMA, the modulated coded signal has a much higher data bandwidth than the data being communicated. A spread spectrum scheme uniformly spreads the bandwidth of the data for the same transmitted power.

Each user in a CDMA system uses a different code to modulate their signal. Choosing the codes used to modulate the signal is very important in the performance of CDMA systems. When there is good separation between the signal of a desired user and the signals of other users, a CDMA system performs well. Generally, CDMA can be synchronous (orthogonal codes); or asynchronous (pseudorandom codes).

In CDMA channel access, a chip is a pulse of a Direct-Sequence Spread Spectrum (DSSS) code, such as a pseudo-noise code sequence used. In a binary direct-sequence system, each chip is typically a rectangular pulse of +1 or −1 amplitude, which is multiplied by a data sequence (similarly +1 or −1 representing the message bits) and by a carrier waveform to make the transmitted signal. The chips are therefore just the bit sequence out of the code generator. The chip rate of a code is the number of pulses per second (chips per second) at which the code is transmitted/received. The chip rate is larger than the symbol rate, meaning that one symbol is represented by multiple chips. In under loaded or fully loaded CDMA systems the number of chips is greater than or equal to the number of users. On the other hand, in overloaded CDMA the number of chips is less than the number of users. Thus, overloaded systems are more efficient from bandwidth point of view.

Under loaded or fully loaded synchronous CDMA exploits mathematical properties of orthogonality between vectors representing the data strings. Each user in these systems uses a code orthogonal to the others' codes to modulate their signal. Orthogonal codes have a cross-correlation equal to zero; in other words, they do not interfere with each other.

However, in overloaded CDMA there are no such orthogonal codes and so it is impossible to take the advantages of this concept in user data extraction. In fact, in these cases, encoders and decoders are typically complex and require numerous multiplication and addition operations.

SUMMARY

In some embodiments, the present invention is an encoding method for synchronous code division multiple access (CDMA) in an overloaded systems. The method includes providing an $(m_1 \times n_1)$ logical encoder (LE) $S^1$ to define a sequence of encoders by calculating the following recursive relation, where a $k^{th}$ generation encoder $S^k$, is a $(m_k \times n_k)$ LE sequence formed as follows:

$$S^k = \begin{bmatrix} +\alpha_k & \cdots & +\alpha_k & +\alpha_k & +\alpha_k & \cdots & +\alpha_k \\ +\beta_k & \cdots & +\beta_k & 0 & -\beta_k & \cdots & -\beta_k \\ & & & 0 & & & \\ & \hat{S}^{k-1} & & 0 & & 0 & \\ & & & \vdots & & & \\ & 0 & & 0 & & \hat{S}^{k-1} & \\ & & & 0 & & & \end{bmatrix} \quad (1)$$

where $m_k = 2^{k-1} m_1$, $n_k = 2^{k-1}(n_1+1)-1$, $\hat{S}^{k-1}$ is derived by eliminating the first row of $S^{k-1}$ and $\alpha_k$ and $\beta_k$ are two arbitrary numbers.

The method may further include obtaining a class of encoders by setting $\alpha_k = \beta_k = 1$; and calculating the first three matrices $S^1$, $S^2$, and $S^3$ in said LE sequence as:

$$S^1 \quad \begin{bmatrix} +1 & +1 & +1 \\ +1 & 0 & -1 \end{bmatrix}$$

$$S^2 \quad \begin{bmatrix} +1 & +1 & +1 & +1 & +1 & +1 & +1 \\ +1 & +1 & +1 & 0 & -1 & -1 & -1 \\ +1 & 0 & -1 & 0 & 0 & 0 & 0 \\ 0 & 0 & 0 & 0 & +1 & 0 & -1 \end{bmatrix}$$

$$S^3 \quad \begin{bmatrix} +1 & +1 & +1 & +1 & +1 & +1 & +1 & +1 & +1 & +1 & +1 & +1 & +1 & +1 & +1 \\ +1 & +1 & +1 & +1 & +1 & +1 & +1 & 0 & -1 & -1 & -1 & -1 & -1 & -1 & -1 \\ +1 & +1 & +1 & 0 & -1 & -1 & -1 & 0 & 0 & 0 & 0 & 0 & 0 & 0 & 0 \\ +1 & 0 & -1 & 0 & 0 & 0 & 0 & 0 & 0 & 0 & 0 & 0 & 0 & 0 & 0 \\ 0 & 0 & 0 & 0 & +1 & 0 & -1 & 0 & 0 & 0 & 0 & 0 & 0 & 0 & 0 \\ 0 & 0 & 0 & 0 & 0 & 0 & 0 & 0 & +1 & +1 & +1 & 0 & -1 & -1 & -1 \\ 0 & 0 & 0 & 0 & 0 & 0 & 0 & 0 & +1 & 0 & -1 & 0 & 0 & 0 & 0 \\ 0 & 0 & 0 & 0 & 0 & 0 & 0 & 0 & 0 & 0 & 0 & 0 & +1 & 0 & -1 \end{bmatrix}$$

And comprising extracting user data from the received vector coded by said LE sequence by a number of comparisons with respect to predefined thresholds.

In some embodiments, the present invention is a decoding method for synchronous Code Division Multiple Access (CDMA) comprising said the logical decoder:

for $S^1$, assume that $Y=[y_1, y_2]^T = S^1 X$, where X is the vector of user data. We want to find X, the decoded data, from Y by following procedure:

passing $y_1$ to a quaternary Pulse amplitude modulated (PAM) decoder with constellation of $\{\pm 1, \pm 3\}$ to generate an output of z, which shows the number of +1s and −1s in X;

If $z=+3$ or $z=-3$, then, stop;

otherwise, from $y_2$ and z:

if $z=+1$: passing $y_2$ to a ternary PAM decoder with constellation of $\{0, \pm 2\}$, to determine which user sent said −1;

if $z=-1$: passing $y_2$ to a ternary PAM decoder with constellation of $\{0, \pm 2\}$ to determine which user sent said +1;

for $S^k$, $k \geq 2$ passing $y_1$ to a $(2^{k+1})$-ary PAM decoder with a constellation of $\{\pm 1, \pm 3, \pm (2^{k+1}-1)\}$ to generate an output of z, which shows the number of +1s and −1s in X; If z is $+(2^{k+1}-1)$ or $-(2^{k+1}-1)$, then the process is terminated and $\hat{X}$ is composed purely of +1s or −1s, respectively; otherwise, passing $y_2$ to a $(2^{k+1}-|z|)$-ary PAM decoder with a constellation of $\{0, \pm 2, \pm (2^{k+1}-|z|)\}$ to generate an output; combining said output and information about the total number of −1s and +1s in X, it is possible to decipher the $2^{k^{th}}$ entry of $\hat{X}$. Moreover, one may determine the number of +1s and −1s in the first and last $2^k-1$ entries of $\hat{X}$, denoted by $n_l$ and $n_r$, respectively.

Applying the decoder of $S^{k-1}$ with inputs of $$Y_l = \begin{bmatrix} 2^{k-1} - 1 - 2n_l \\ y_3 \\ \vdots \\ y_{2^{k-1}+1} \end{bmatrix} \text{ and } Y_r = \begin{bmatrix} 2^{k+1} - 1 - 2n_r \\ y_{2^{k-1}+1} \\ \vdots \\ y_{2^k} \end{bmatrix} \quad (3)$$

to identify the first and last $(2^k-1)$ entries of $\hat{X}$.

In decoding method may be performed by a plurality of comparator elements but with no multiplier elements or adder elements. In fact, the one dimensional PAM decoder can extract user data by a number of comparisons with respect to some thresholds depending on the constellation.

DETAILED DESCRIPTION

Figure 1:
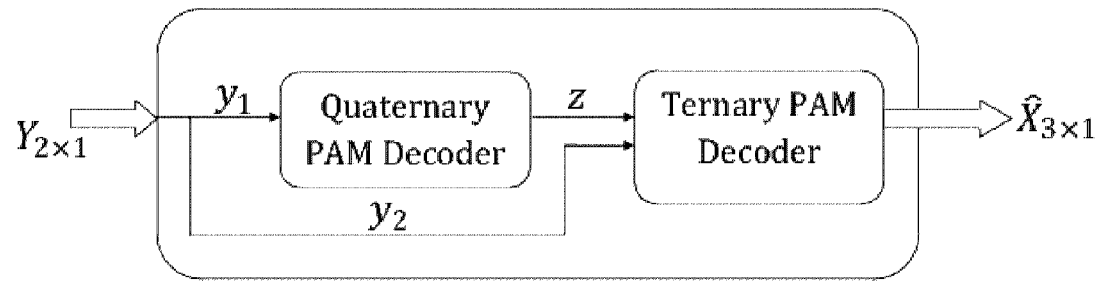
FIG. 1 is an exemplary block diagram for a logical decoder for $S^1$, according to some embodiments of the present invention.

In some embodiments, the present invention is an encoding-decoding scheme for overloaded synchronous CDMA systems. The decoder requires comparators but with no multipliers nor adders. The performance (Bit-Error-Rate) of the decoder is almost as good as that of an optimum Maximum Likelihood (ML) decoder, despite the fact that the complexity of the invented decoder is much less than the optimum ML decoder.

In some embodiments, the present invention is a recursive method, performed by an electronic circuit or device, for constructing uniquely decodable codes for overloaded synchronous CDMA systems, where large signature codes with growing overloading factors can be reconstructed from the small ones. A class of uniquely decodable signature matrices (or encoders) for overloaded synchronous CDMA are devised. Uniquely decodable signature matrices means that these signature matrices act as a one to one projection from specific input symbols to the output space. Moreover, overloaded means that the number of columns of the signature matrices (each column is attributed to one user) is greater than the number of rows (or equivalently the number of chips. In the recursive method, by starting from one of these matrices, a series of this class of uniquely decodable signature matrices can be found. This sequence has an increasing overloading factor (the ratio of the number of columns to the number of rows of the matrices).

In some embodiments, the present invention is a decoder for synchronous CDMA systems. The decoder extracts the user data by a number of comparisons with respect to some predefined thresholds. In fact, the elements of a received vector are compared step by step to some thresholds and user data are extracted by some logical rules. Through these steps, the number of various symbols in different subgroups of users is found. These subgroups become smaller and smaller, and eventually each user data is found by recursively repeating the steps.

The corresponding decoders for a sequence of matrices found by the above recursive encoding method also have a recursive form. Moreover, the proposed encoding and decoding methods are applicable to systems in which the signature matrices are p-ary and the input symbols are q-ary.

In some embodiments, the present invention is a class of encoders generated by Kronecker multiplication with a simple decoder.

For the uniquely decodable encoders, projection defined by a corresponding signature matrix is one to one over a set of input symbols. Let $\{\lambda_1, \lambda_2, \ldots, \lambda_j\}$ be a set of j algebraically independent numbers and $\overline{\lambda}$ be a linear combination of the $\lambda_i$s. In the following, it is assumed that the set of M input symbols $\Psi = \{\xi_1, \ldots, \xi_M\}$, is a subset of $\{\lambda_1, \lambda_2, \ldots, \lambda_j, \overline{\lambda}\}$. That is, in an algebraically independent set, the linear combinations of the numbers with integer coefficient cannot become zero.

Now, let us define a Logical Encoder (LE) as:

Definition 1: Signature Matrix $S_{m \times n}$ is said to be LE, if the following constraints hold.

1. S is one to one over $\Psi$.

2. Let $Y_{m \times 1} = S_{m \times n} X_{n \times 1}$, $\hat{Y}_{(m-1) \times 1} = \hat{S}_{(m-1) \times n} X_{n \times 1}$ where $\hat{S}$ is derived by eliminating one of the rows of S. Then, by knowing the number of different symbols in data vector X, it is possible to decipher the user data from $\hat{Y}$ uniquely.

Starting from an $(m_1 \times n_1)$ LE, $S^1$, the following recursive relation defines a sequence of encoders. The $k^{th}$ generation encoder $S^k$, is a $m_k \times n_k$ LE formed as follows:

$$S^k = \begin{bmatrix} +\alpha_k & \ldots & +\alpha_k & +\alpha_k & +\alpha_k & \ldots & +\alpha_k \\ +\beta_k & \ldots & +\beta_k & 0 & -\beta_k & \ldots & -\beta_k \\ & & & 0 & & & \\ & \hat{S}^{k-1} & & 0 & & 0 & \\ & & & \vdots & & & \\ & 0 & & 0 & & \hat{S}^{k-1} & \\ & & & 0 & & & \end{bmatrix} \quad (1)$$

where $m_k = 2^{k-1} m_1$, $n_k = 2^{k-1}(n_1+1)-1$, $\hat{S}^{k-1}$ is derived by eliminating the first row of $S^{k-1}$ and $\alpha_k$ and $\beta_k$ are two arbitrary numbers. It can be seen that the overloading factor increases for the sequence of matrices and approaches $(n_1+1)/m_1$ in infinity.

As an example $$S^1_{2 \times 3} = \begin{bmatrix} +1 & +1 & +1 \\ +1 & 0 & -1 \end{bmatrix} \quad (2)$$

is an LE. Starting from this encoder, recursive construction with $\alpha_i = \beta_i = 1$ for $i=1, \ldots, k$ in (1) results in a sequence of LEs, first three of which can be found in Table 1. The $k^{th}$ generation $S^k$ is a $2^k \times (2^{k+1}-1)$ encoder and the overloding factor approaches 2 as k tends to approach infinity.

TABLE 1

The first three matrices in an LE sequence.

| | |
|---|---|
| $S^1$ | $\begin{bmatrix} +1 & +1 & +1 \\ +1 & 0 & -1 \end{bmatrix}$ |
| $S^2$ | $\begin{bmatrix} +1 & +1 & +1 & +1 & +1 & +1 & +1 \\ +1 & +1 & +1 & 0 & -1 & -1 & -1 \\ +1 & 0 & -1 & 0 & 0 & 0 & 0 \\ 0 & 0 & 0 & 0 & +1 & 0 & -1 \end{bmatrix}$ |
| $S^3$ | $\begin{bmatrix} +1 & +1 & +1 & +1 & +1 & +1 & +1 & +1 & +1 & +1 & +1 & +1 & +1 & +1 & +1 \\ +1 & +1 & +1 & +1 & +1 & +1 & +1 & 0 & -1 & -1 & -1 & -1 & -1 & -1 & -1 \\ +1 & +1 & +1 & 0 & -1 & -1 & -1 & 0 & 0 & 0 & 0 & 0 & 0 & 0 & 0 \\ +1 & 0 & -1 & 0 & 0 & 0 & 0 & 0 & 0 & 0 & 0 & 0 & 0 & 0 & 0 \\ 0 & 0 & 0 & 0 & +1 & 0 & -1 & 0 & 0 & 0 & 0 & 0 & 0 & 0 & 0 \\ 0 & 0 & 0 & 0 & 0 & 0 & 0 & +1 & +1 & +1 & 0 & -1 & -1 & -1 \\ 0 & 0 & 0 & 0 & 0 & 0 & 0 & +1 & 0 & -1 & 0 & 0 & 0 & 0 \\ 0 & 0 & 0 & 0 & 0 & 0 & 0 & 0 & 0 & 0 & 0 & +1 & 0 & -1 \end{bmatrix}$ |

As can be expected from (1), the decoder has also a recursive form. We shed light on this procedure by considering a system that uses $\{\pm 1\}$ as the input symbols and the class of LEs based on (2) as the encoder with the first three of these matrices shown in Table 1.

Firstly, the decoder of $S^1$ will be discussed. In the case that $Y=[y_1,y_2]^T=S^1 X$, where X is the vector of user data, and $\hat{X}$ be the decoded data, the decoding scheme has the following steps:

Step 1: Pass $y_1$ to a quaternary PAM decoder with constellation of $\{\pm 1, \pm 3\}$. The output of this decoder z shows the number of +1s and −1s in $\hat{X}$. If $z=\pm 3$ or $z=-3$ then $\hat{X}$ consists purely of +1s or −1s, respectively, and the process is terminated. Otherwise the process goes to the next step.

Step 2: Upon $y_2$ and z the coding continues as follows:

If $z=+1$: then $\hat{X}$ contains exactly one −1. By passing $y_2$ to a ternary PAM decoder with constellation of $\{0, \pm 2\}$, it can be determined which user sent this −1.

$z=-1$: then $\hat{X}$ contains exactly one +1. By passing $y_2$ to a ternary PAM decoder with constellation of $\{0, \pm 2\}$, it can be determined which user sent this +1. FIG. 1 shows this procedure. The block shown in FIG. 1 can be implemented in electronic circuits, programmable gate arrays, programmable signal processors, software, or the combination thereof, and the like.

Figure 2:
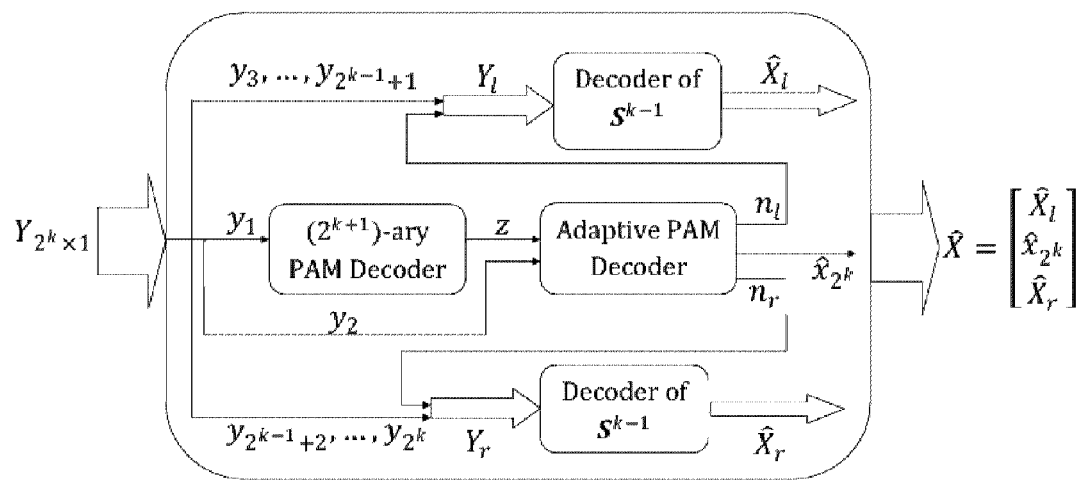
FIG. 2 is an exemplary block diagram for a logical decoder for $S^k$, $k \geq 2$, according to some embodiments of the present invention.

Now, for $S^k$, $k \geq 2$ the decoding procedure is recursive. FIG. 2 is an exemplary block diagram for a logical decoder for $S^k$, $k \geq 2$, according to some embodiments of the present invention. As depicted in FIG. 2, there are three main steps:

Step 1: Pass $y_1$ to a $(2^{k+1})$-ary PAM decoder with a constellation of $\{\pm 1, \pm 3, \pm(2^{k+1}-1)\}$. The output of this decoder z shows the number of +1s and −1s in $\hat{X}$. If z is $+(2^{k+1}-1)$ or $-(2k+1-1)$, then the process is terminated and $\hat{X}$ is composed purely of +1s or −1s, respectively. Otherwise, the process moves to the next step.

Step 2: Pass $y_2$ to a $(2^{k+1}-|z|)$-ary PAM decoder with a constellation of $\{0, \pm 2, \pm(2^{k+1}-1-|z|)\}$. Combining the output information of this decoder and the knowledge about the total number of −1s and +1s in $\hat{X}$, it is possible to decipher the $2^{k^{th}}$ entry of $\hat{X}$. Moreover, one may determine the number of +1s and −1s in the first and last $2^k-1$ entries of $\hat{X}$, denoted by $n_l$ and $n_r$, respectively. These are all possible because of the characteristics of the previously input set $\{\lambda_1, \lambda_2, \ldots, \lambda_j, \overline{\lambda}\}$.

Step 3: Apply the decoder of $S^{k-1}$ with inputs of $$Y_l = \begin{bmatrix} 2^{k-1}-1-2n_l \\ y_3 \\ \vdots \\ y_{2^{k-1}+1} \end{bmatrix} \text{ and } Y_r = \begin{bmatrix} 2^{k+1}-1-2n_r \\ y_{2^{k-1}+1} \\ \vdots \\ y_{2^k} \end{bmatrix} \quad (3)$$

to identify the first and last $2^k-1$ entries of $\hat{X}$.

It is straightforward extrapolation to extend this method for an M-ary input system. In addition, for any other sequence of matrices, we should just modify the decoder of $S^1$ and the recursive algorithm remain the same. Note, if $P_{r \times r}$ is an invertable matrix and $S_{m \times n}$, then $P \otimes S$ is also an (rm×rn) uniquely decodable encode *(where $\otimes$ denotes the Kronecker multiplication). By multiplying the received vector with $P^{-1} \otimes I$ from the left, r logical decoder can be applied to extract the user data.

The block shown in FIG. 2 can be implemented in electronic circuits, programmable gate arrays, programmable signal processors, software, or the combination thereof, and the like.

Figure 3:
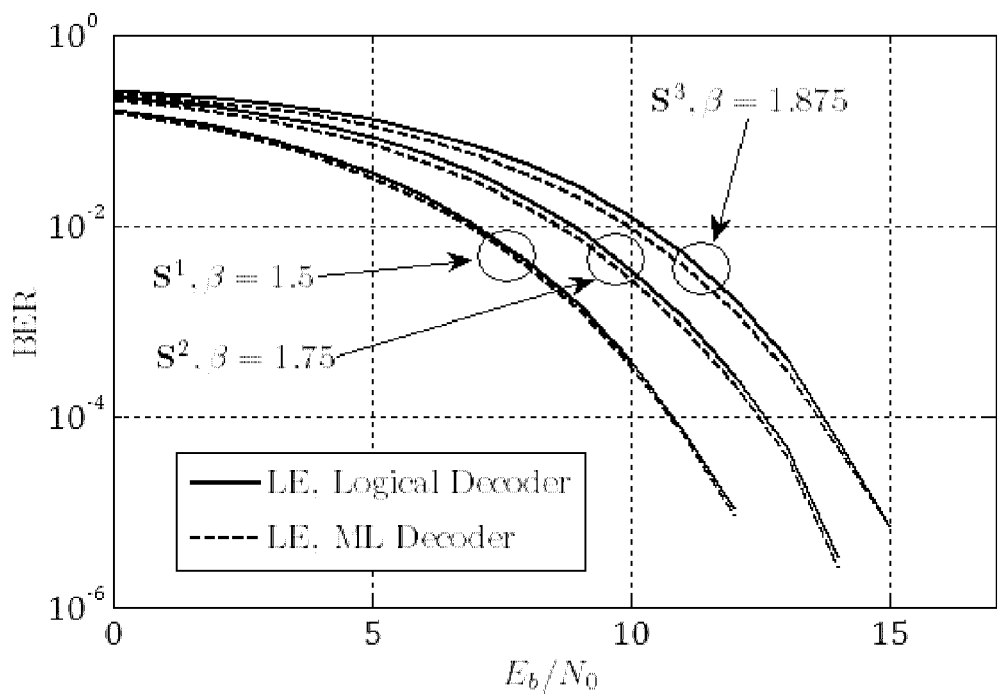
FIG. 3 shows a graph depicting a comparison of BER of a logical decoder versus BER of an ML decoder for the first three logical encoders (LEs) for, $S^1$, $S^2$, $S^3$ and different values of $E_b/N_0$, according to some embodiments of the present invention.

A Binary phase-shift keying (BPSK) system with different values of $E_b/N_0$ was simulated. Note that the LEs are those proposed in Table 1. FIG. 3 compares the BER of the proposed logical decoder versus the ML one for the first three LEs. The first two rows of Table 2 show the computational complexity of these decoders. While the ML decoder is rather complex, the logical decoder applies only a few comparisons and needs no multiplication or addition. Nevertheless, the performance of the ML decoder is slightly better than the logical one.

TABLE 2

Computational complexity of the logical and ML decoder of LE versus simplified ML decoder of GCO.

| | | | Size of the Matrices | | |
|---|---|---|---|---|---|
| Encoder | Decoder | | (2 × 3) | (4 × 7) | (8 × 15) |
| LE | Logical | Mul. + Add. | None | None | None |
| | | Comparisons | 2.75 | 7.86 | 21.30 |
| LE | ML | Mul. + Add. | 24 | 896 | 491520 |
| | | Comparisons | 7 | 123 | 32768 |
| GCO | ML | Mul. + Add. | 18 | 280 | 17280 |
| | | Comparison | 1 | 7 | 63 |

Systems using Generalized Codes for Overloaded CDMA (GCOs) of the same size with $\{0,\pm1\}$ entries have also been simulated. A more detail disclosure of GCOs can be found in Alishahi, K. and Dashmiz, S. and Pad, P. and Marvasti, F. and Shafinia, M H and Mansouri, M.; "The Enigma of CDMA Revisited," *Arxiv preprint arXiv:* 1005.0677, 2010 ([1]), the entire contents of which is hereby expressly incorporated by reference.

Figure 4:
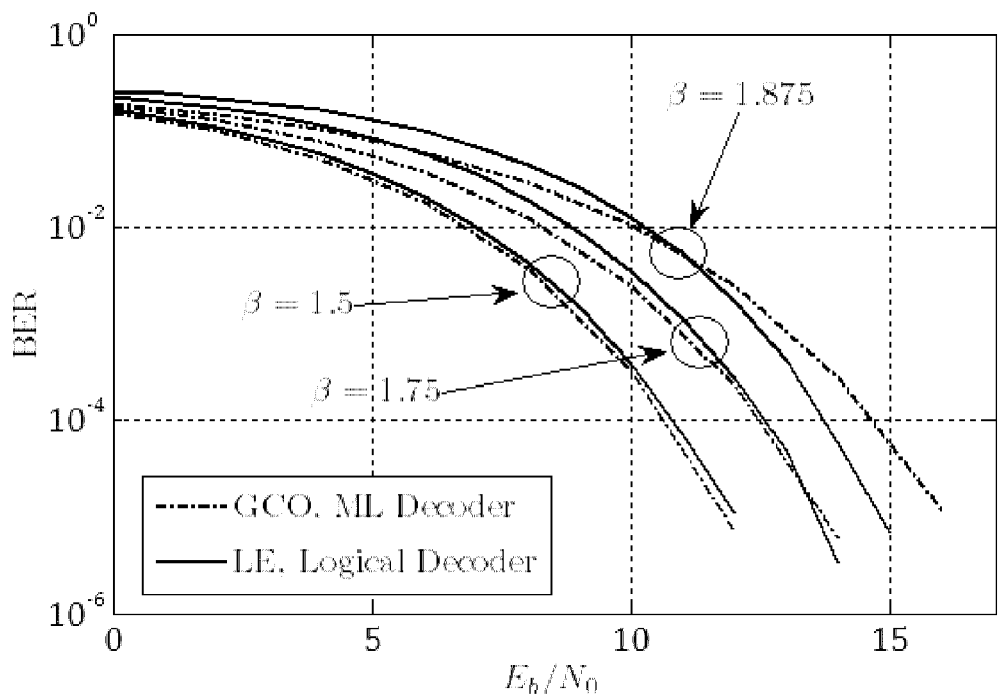
FIG. 4 shows a graph depicting a comparison of BER of the invention using LE with logical decoder and the BER of a system using GCO with an ML decoder.
Figure 5:
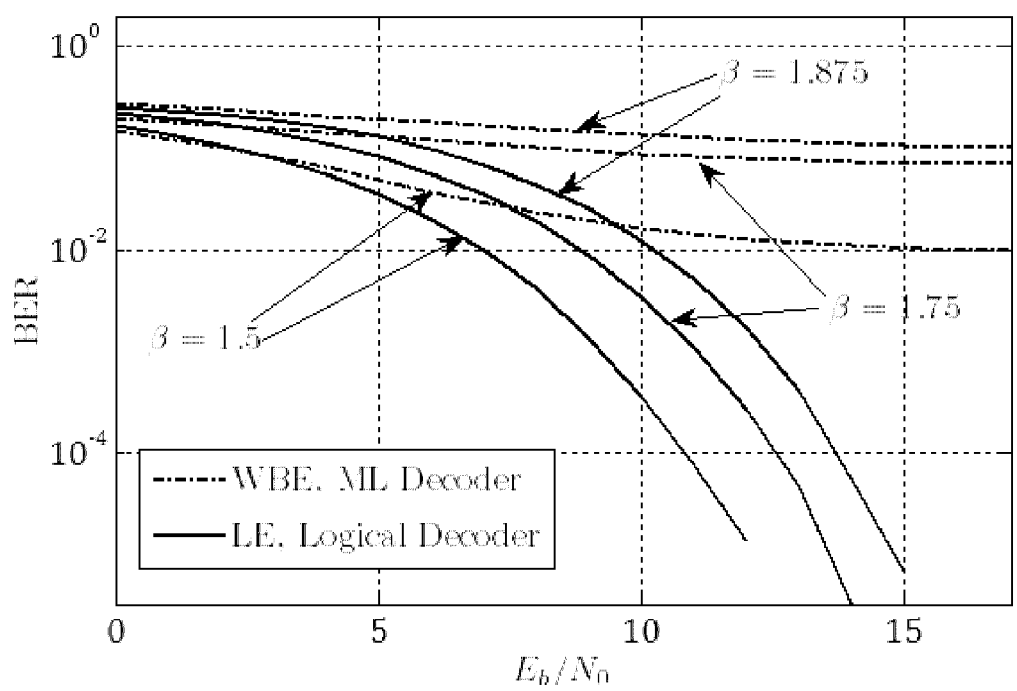
FIG. 5 shows a graph depicting a comparison of BER of the LEs with logical decoder and WBEs of the same oveloading factor ($\beta$) with an ML decoder.

It is noteworthy that the (2×3) GCO is the same as $S^1$. FIG. 4 shows the results. Although GCO has a simplified ML decoder [1], it is yet more sophisticated than the logical decoder (see Table 2). In addition, the BER of the LE with the logical decoder becomes better for moderate values of $E_b/N_0$. In addition, FIG. 5, compares the BER of the LEs and WBEs of the same oveloading factor (β). Note that the decoder for the WBE is ML. Simulations have been performed for the first three LEs and WBEs with same overloading factor (β). A more detail discussion of WBEs can be found in Karystinos, G. N. and Pados, D. A; "New bounds on the total squared correlation and optimum design of DS-CDMA binary signature sets," *IEEE Transactions on Communications,* 51(1):48-51, 2003, the entire contents of which is hereby expressly incorporated by reference.

Although the encoder/decoder methods are disclosed for input vectors containing ±1 elements, the methods can be generalized, so that the input vector can choose its elements from a broader range of input symbols. This is true as long as the input symbols hold some criteria. Moreover, the Encoder/Decoder can be generalized by using the Kronecker multiplication.

The encoding and decoding method of the present invention may be performed by any electronic device, such as, dedicated electronic circuits, general purpose computers, personal computers, dedicated processors, and the like.

It will be recognized by those skilled in the art that various modifications may be made to the invention illustrated and any other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A data encoding method, executed by one or more processors, for synchronous Code Division Multiple Access (CDMA) communication in overloaded systems, comprising:

calculating, by one or more processors, recursive process for K=1 to a predetermined integer value to define a $k^{th}$ generation $m_k \times n_k$ signature matrix sequence $S^k$:

$$S^k = \begin{bmatrix} +\alpha_k & \cdots & +\alpha_k & +\alpha_k & +\alpha_k & \cdots & +\alpha_k \\ +\beta_k & \cdots & +\beta_k & 0 & -\beta_k & \cdots & -\beta_k \\ & & & 0 & & & \\ & \hat{S}^{k-1} & & 0 & & 0 & \\ & & & \vdots & & & \\ & 0 & & 0 & & \hat{S}^{k-1} & \\ & & & 0 & & & \end{bmatrix} \quad (1)$$

$S^1$ is an $(m_1 \times n_1)$ signature matrix, and
where $m_k = 2^{k-1} m_1$, $n_k = 2^{k-1}(n_1+1)-1$, $\hat{S}^{k-1}$ is derived by eliminating the first row of $S^{k-1}$ and $\alpha_k$ and $\beta_k$ are two arbitrary numbers;
using the $S^k$ encoder to encode data transmission over a communication channel; and
transmitting the encoded date over said communication channel.

2. The data encoding method of claim 1, further comprising determining a class of encoders by setting $\alpha_k = \beta_k = 1$; and calculating the first three $S^1$, $S^2$, and $S^3$ signature matrix sequences:

$$S^1 \quad \begin{bmatrix} +1 & +1 & +1 \\ +1 & 0 & -1 \end{bmatrix}$$

$$S^2 \quad \begin{bmatrix} +1 & +1 & +1 & +1 & +1 & +1 & +1 \\ +1 & +1 & +1 & 0 & -1 & -1 & -1 \\ +1 & 0 & -1 & 0 & 0 & 0 & 0 \\ 0 & 0 & 0 & 0 & +1 & 0 & -1 \end{bmatrix}$$

$$S^3 \begin{bmatrix} +1 & +1 & +1 & +1 & +1 & +1 & +1 & +1 & +1 & +1 & +1 & +1 & +1 & +1 & +1 \\ +1 & +1 & +1 & +1 & +1 & +1 & +1 & 0 & -1 & -1 & -1 & -1 & -1 & -1 & -1 \\ +1 & +1 & +1 & 0 & -1 & -1 & -1 & 0 & 0 & 0 & 0 & 0 & 0 & 0 & 0 \\ +1 & 0 & -1 & 0 & 0 & 0 & 0 & 0 & 0 & 0 & 0 & 0 & 0 & 0 & 0 \\ 0 & 0 & 0 & 0 & +1 & 0 & -1 & 0 & 0 & 0 & 0 & 0 & 0 & 0 & 0 \\ 0 & 0 & 0 & 0 & 0 & 0 & 0 & 0 & +1 & +1 & +1 & 0 & -1 & -1 & -1 \\ 0 & 0 & 0 & 0 & 0 & 0 & 0 & 0 & +1 & 0 & -1 & 0 & 0 & 0 & 0 \\ 0 & 0 & 0 & 0 & 0 & 0 & 0 & 0 & 0 & 0 & 0 & 0 & +1 & 0 & -1 \end{bmatrix}.$$

3. The data encoding method of claim 1, wherein said data encoding is performed by a plurality of comparator operations, without multiplier operations or adder operations.

4. The data encoding method of claim 1, wherein said $m_k \times n_k$ signature matrix sequence is generated by a Kronecker multiplication method.

5. A data decoding method, executed by one or more processors, for synchronous code division multiple access (CDMA) communication comprising:

receiving a vector of encoded data Y from a communication channel;

for a signature matrix sequence $S^1$, given that $Y=[y_1,y_2]^T$, extracting $y_1$ and $y_2$ from the received Y vector;

inputting $y_1$ to a quaternary Pulse amplitude modulated (PAM) decoder with constellation of $\{\pm 1, \pm 3\}$ to generate an output of z, which shows the number of +1 and −1 constelations in $\hat{X}$, where $\hat{X}$ is decoded data;

if z=+3, outputting the decoded data $\hat{X}$ as [+1, +1, +1];

if z=−3, outputting the decoded data $\hat{X}$ as [−1, −1, −1];

if z=+1, inputting $y_2$ to a ternary PAM decoder with constellation of $\{0,\pm 2\}$ to determine index of any −1 in $\hat{X}$ and outputting the decoded data $\hat{X}$;

if z=−1, inputting $y_2$ to said ternary PAM decoder with constellation of $\{0,\pm 2\}$ to determine index of any +1 in the decoded data $\hat{X}$ and outputting the decoded data $\hat{X}$;

for the signature matrix sequence $S^k$, k≥2, inputting $y_1$ to a $(2^{k+1})$-ary PAM decoder with a constellation of $\{\pm 1, \pm 3, \pm(2^{k+1}-1)\}$ to generate said output of z, which shows the number of +1 and −1 in the decoded data $\hat{X}$, wherein $y_1$ is a first element of said received vector of encoded data Y;

if z is $+(2^{k+1}-1)$, then outputting the decoded data $\hat{X}$ composed of +1;

if z is $-(2^{k+1}-1)$, then outputting the decoded data $\hat{X}$ composed of −1;

otherwise, inputting $y_2$ to a $(2^{k+1}-|z|)$-ary PAM decoder with a constellation of $\{0,\pm 2, \pm(2^{k+1}-1-|z|)\}$ to generate a PAM output, wherein $y_2$ is a second element of said received vector of encoded data Y;

combining said PAM output and said z output, which includes the total number of −1 and +1 in $\hat{X}$ to obtain the $2^{k^{th}}$ element of $\hat{X}$, and the number of +1 and −1 in the first and last $2^k-1$ elements of the decoded data $\hat{X}$, denoted by $n_l$ and $n_r$, respectively;

applying the decoder of $S^{k-1}$ with inputs of $$Y_l = \begin{bmatrix} 2^{k+1}-1-2n_l \\ y_3 \\ \vdots \\ y_{2^{k-1}+1} \end{bmatrix} \text{ and } Y_r = \begin{bmatrix} 2^{k+1}-1-2n_r \\ y_{2^{k-1}+1} \\ \vdots \\ y_{2^k} \end{bmatrix} \quad (3)$$

to identify the first and last $2^k-1$ elements of the decoded data $\hat{X}$, wherein $y_n$ is the $n^{th}$ element of said received vector of encoded data Y; and combining the obtained $2^{k^{th}}$ element, said first and last $2^k-1$ elements to obtain the entire decoded data $\hat{X}$.

6. The data decoding method of claim 5, further comprising extracting user data from said received vector by a number of comparisons according to predefined thresholds.

7. The data decoding method of claim 5, wherein said comparisons comprise of comparing each element of said received vector to said predefined thresholds and extracting said user data by a plurality of logical rules.

8. The data decoding method of claim 5, wherein said decoding is performed by a plurality of comparator operations, without multiplier operations or adder operations.

9. The data decoding method of claim 5, wherein said method is utilized in a compressed sensing (CS) system.

* * * * *

UNITED STATES PATENT AND TRADEMARK OFFICE
CERTIFICATE OF CORRECTION

PATENT NO. : 8,582,604 B2  
APPLICATION NO. : 13/082084  
DATED : November 12, 2013  
INVENTOR(S) : Omid Mashayekhi et al.

Page 1 of 1

It is certified that error appears in the above-identified patent and that said Letters Patent is hereby corrected as shown below:

In the Claims

Col. 8, line 50, Claim 1  Delete "encoded date",  
Insert --encoded data--

Col. 9, line 25, Claim 5  Delete "$Y=[y_1,y_2]^T$",  
Insert --$Y=[y_1,y_2]^T=S^1$--

Col. 9, line 30, Claim 5  Delete "constelations",  
Insert --constellations--

Col. 9, line 45, Claim 5  Delete " $\hat{X}$ composed",  
Insert -- $\hat{X}$ is composed--

Col. 9, line 45, Claim 5  Delete " $\hat{X}$ composed",  
Insert -- $\hat{X}$ is composed--

Signed and Sealed this  
Twenty-fourth Day of June, 2014

Michelle K. Lee  
*Deputy Director of the United States Patent and Trademark Office*